United States Patent [19]

Plumettaz

[11] 4,285,454
[45] Aug. 25, 1981

[54] CABLE CONVEYOR

[75] Inventor: Gérard Plumettaz, BEX, Switzerland

[73] Assignee: Plumettaz, S.A., Canton of Vaud, Switzerland

[21] Appl. No.: 45,395

[22] Filed: Jun. 4, 1979

[30] Foreign Application Priority Data

Jun. 13, 1978 [EP] European Pat. Off. ........ 78200040.0

[51] Int. Cl.³ ............................................ B65H 17/22
[52] U.S. Cl. ..................................... 226/174; 226/195
[58] Field of Search ............... 226/172, 174, 176, 177, 226/108, 195, 184, 188

[56] References Cited

U.S. PATENT DOCUMENTS

| 3,473,715 | 10/1969 | Shuey, Jr. | 226/108 |
| 3,515,328 | 6/1970 | Smith, Jr. | 226/172 |
| 3,612,374 | 10/1971 | Shartzer | 226/172 |

Primary Examiner—Leonard D. Christian
Attorney, Agent, or Firm—Stevens, Davis, Miller & Mosher

[57] ABSTRACT

A cable is supported and advanced by two moving assemblies disposed in the form of a V and each preferably comprising a notched belt of rectangular cross-section. Rollers supporting the notched belts are in turn supported by shafts and are placed overhangingly on these shafts, the lower ends of which are connected to a frame. Neither the frame nor the drive means exceed the driving belts in width. A holding assembly, supported by a framework which has four uprights and also does not exceed the driving belts in width, is removable, and the uprights are hinged to the upper ends of fixed shafts of the intermediate rollers.

9 Claims, 5 Drawing Figures

CABLE CONVEYOR

This invention relates to a cable conveyor of the type comprising a frame, drive means, and a cable-advancing gear-train including at least one supporting and advancing assembly disposed beneath the cable and a holding assembly acting vertically upon the cable to maintain contact between the cable and the supporting and advancing assembly or assemblies.

Cable conveyors are used for laying cables or pipes in trenches, in tunnels, or within tubular conduits when they are to be installed underground or on brackets in tunnels. They are often combined with winches, but conveyors without winches are likewise used as intermediate equipment. The requirements to be met by apparatus of this type in practice are multiple and contradictory. It is advantageous for the conveyors to be as light and easy to install as possible. However, they must also be sufficiently stable.

It is also advantageous for the conveyors to be compact in size, but nevertheless capable of reliably advancing and guiding the cable. In certain cases, the conveyor is required to push the cable ahead, while in other cases, the principal resistance is exerted behind the conveyor.

In general, however, the cable to be laid is hooked at its front end to a metal traction cable which is wound on a winch placed at the end of one section of the cable-laying site. The only functions of the conveyor are then to guide the cable, to ensure that it moves along regularly, and to relieve the tensile stress at the end. However, a problem of regulation arises, for the speeds of the conveyors and of the winch must be synchronized. It is essential to keep the cable from being subjected to tensile stresses exceeding precise limits which are determined by the design of the cable and are often relatively low. Since it is during laying of the cable that the latter is subjected to maximum tensile stresses, and since the requirements for high resistance of the cable to traction are reflected in its cost price, it is of great advantage to produce cable-laying installations which perform this operation with minimum stress.

There are already various models of cable conveyors, with or without winches, of the type initially mentioned. These conveyors are equipped with internal combustion engines or with electric motors. The supporting and advancing assembly or assemblies include either chain wheels supporting chains equipped with shoes, or wheels with profiled pneumatic tires, or rows of pulleys or rollers on which belts are mounted, the latter being profiled to form grooves for receiving the cable.

The holding assembly often includes a number of rollers having V-shaped grooves which are mounted on hinged arms, held in place by springs, and which can be pressed against the cable either by hydraulic jacks or by other devices such as pressure screws. In the conveyors hitherto disclosed, the frame is a structure which surrounds the drive means and the advancing gear-train ensuring the rigidity of the apparatus.

Thus, U.S. Pat. No. 3,473,715 describes a handling apparatus in which a cable or pipe is held against two sets of supporting and advancing wheels by a third set of wheels mounted on a carriage situated at the top of the apparatus. This upper set of wheels constitutes a holding assembly which is connected to the frame of the apparatus by columns situated to one side of the supporting and advancing assemblies constituted by the other two sets of wheels.

It is an object of this invention to provide a cable conveyor of the type initially mentioned which better satisfies the various requirements set forth above than do prior art conveyors, and which is, in particular, compact in size and can be placed in a trench without the need for any hoist or moving equipment.

A further object of this invention is to provide a cable conveyor which allows the production of cable-laying installations comprising a winch and a series of conveyors having control means for easy synchronization of the conveyors with the winch and for laying a cable with a total assurance of avoiding any risk that the cable will be subjected to tensile stresses beyond a given limit.

To this end, there is provided according to the present invention a cable conveyor comprising a frame, a motor supported by the frame, and a cable-advancing gear-train composed of two supporting and advancing assemblies disposed in the form of a V and of a holding assembly acting vertically on the cable to hold it in contact with the supporting and advancing assemblies, the frame including a rigid base disposed beneath and between the two supporting and advancing assemblies so as not to exceed the width of the cable-advancing gear-train, the motor being accommodated in the frame so as not to exceed the width of the frame, and said supporting and advancing assemblies comprising rollers and shafts bearing the rollers overhangingly, in which conveyor the shafts are connected at one end to the frame, and the holding assembly includes a rigid framework resting upon the free end of certain ones of said shafts.

A preferred embodiment of the invention will now be described in detail with reference to the accompanying drawings, in which.

Figure 1:
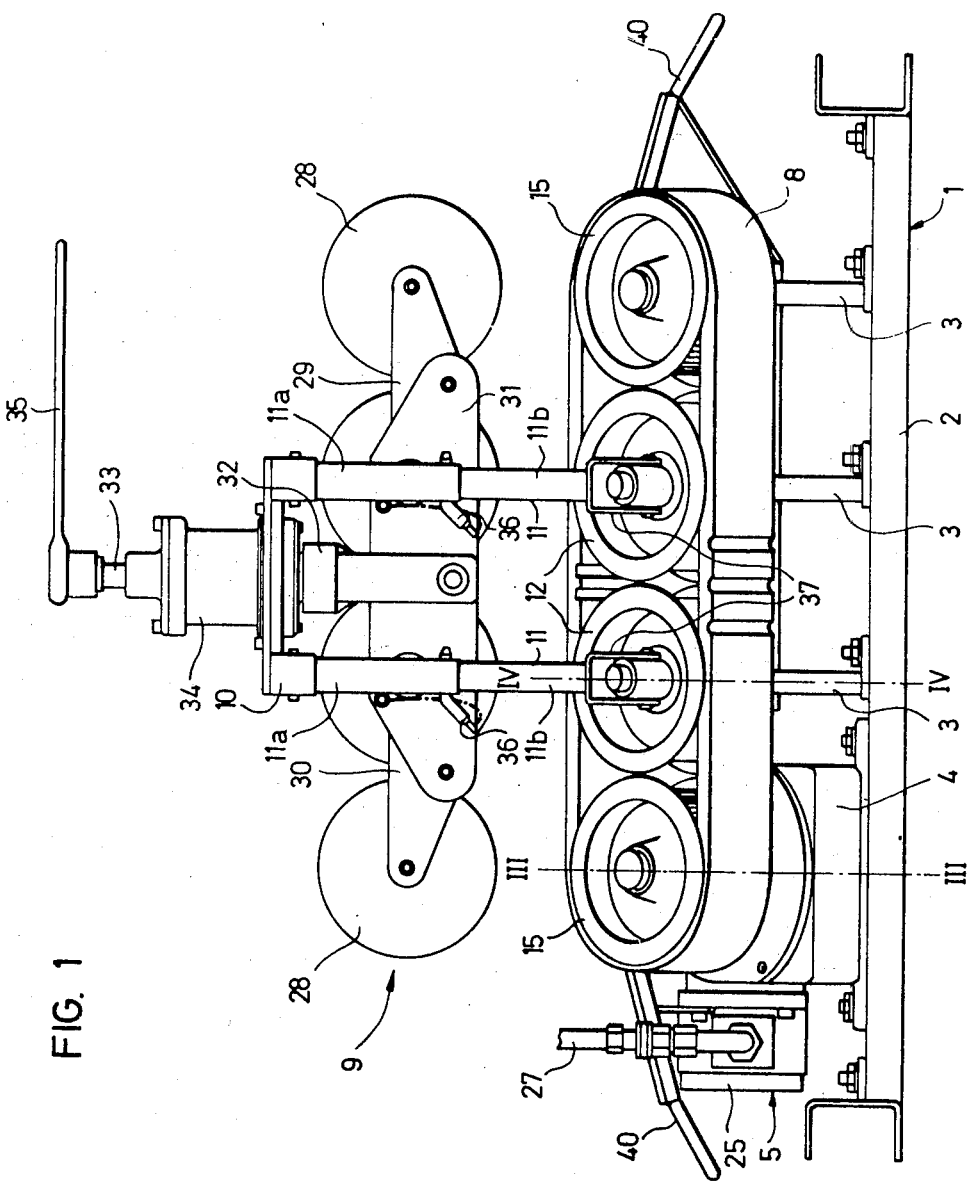
FIG. 1 is a side elevation.
Figure 2:
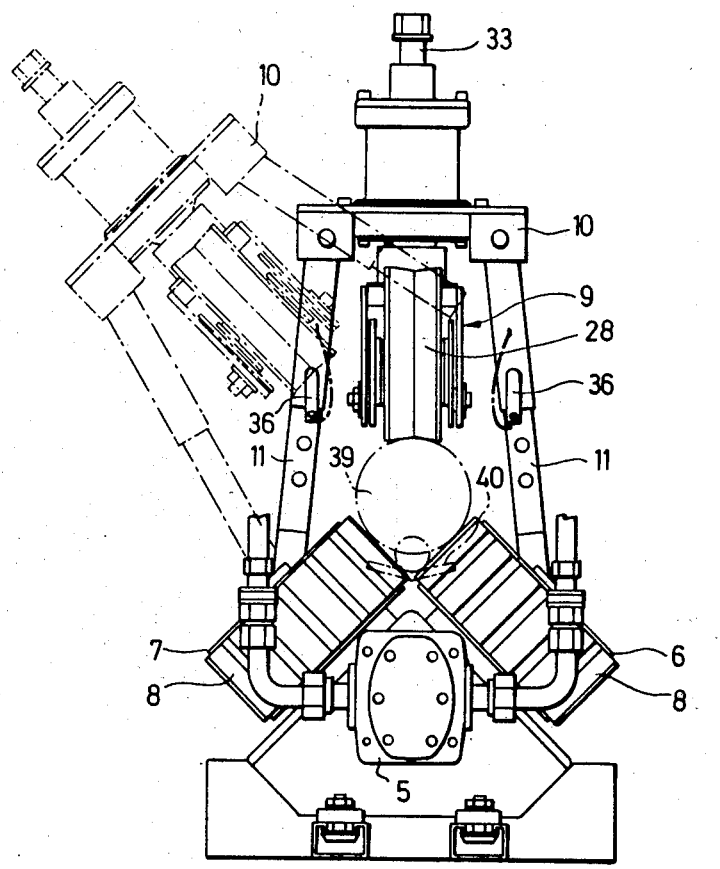
FIG. 2 is a front elevation.

FIGS. 1 and 2 show the general arrangement of the conveyor. A base 1 includes a chassis 2 of sectional iron to which three feet 3 and a gear box 4 are bolted. Gear box 4 bears a hydraulic motor 5 disposed at one end of the apparatus. The cable-advancing gear-train driven by motor 5 comprises two supporting and advancing assemblies 6 and 7 (FIG. 2), each including, as will be seen below, four rollers 12 and 15 and a notched belt 8, and a holding assembly 9 composed of a series of rollers 28 supported by levers articulated to a framework 10, uprights 11 of which are connected to base 1. The holding assembly does not comprise any belt, and rollers 28 act directly upon the cable.

Figure 4:
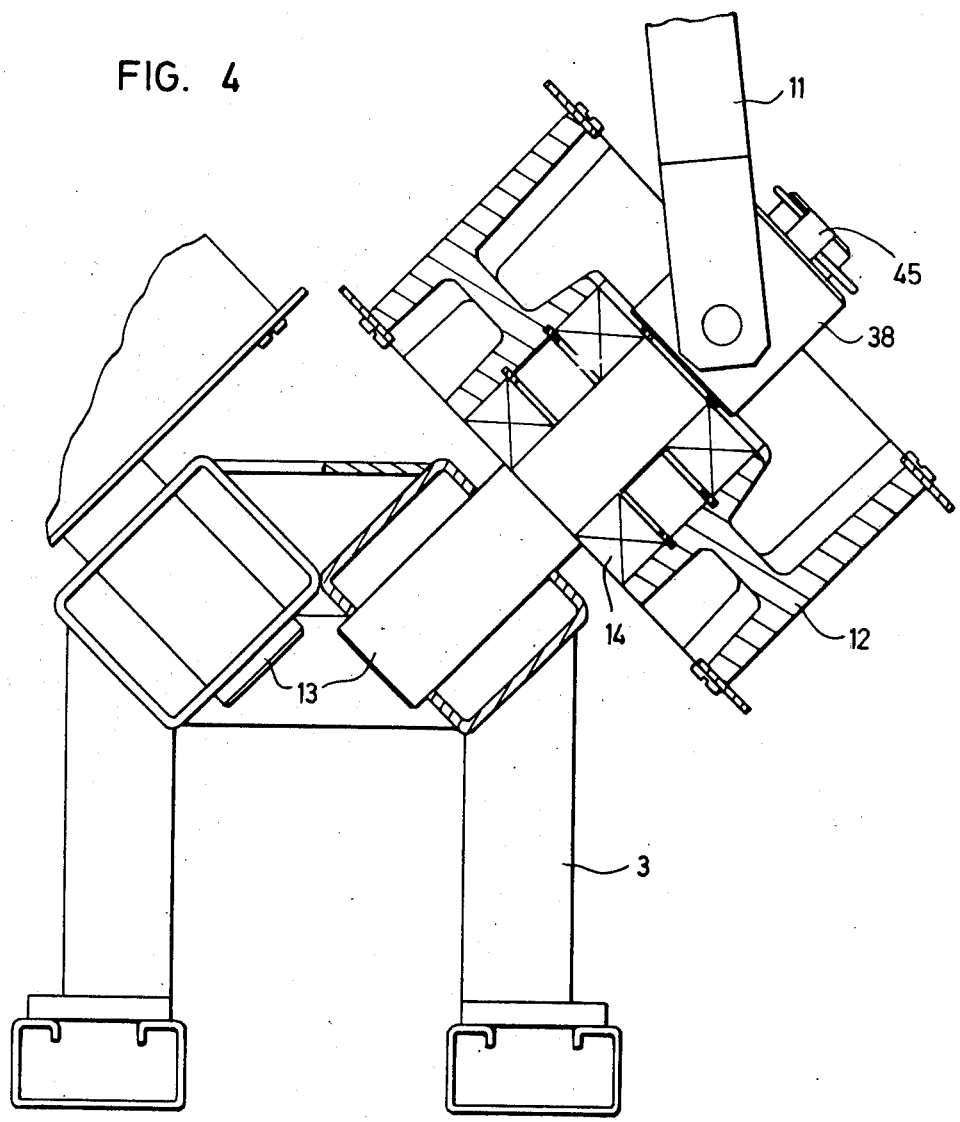
FIG. 4 is a partial section on a larger scale, taken on the line IV—IV of FIG. 1.

FIG. 4 shows how the two loose rollers 12 of each of the supporting and advancing assemblies are mounted on base 1. Foot 3, formed of sectional pieces welded to one another in a stirrup shape, is secured to the longitudinal beams 2 of base 1 and bears two shafts 13 disposed in the form of a V at a 90° angle to one another and welded at their lower ends at a 45° angle to the top part of the stirrup. Each of the shafts 13 bears a double ball bearing 14 on which one of the rollers 12 is mounted.

The latter have a smooth side surface and serve to guide and support belt 8.

Figure 3:
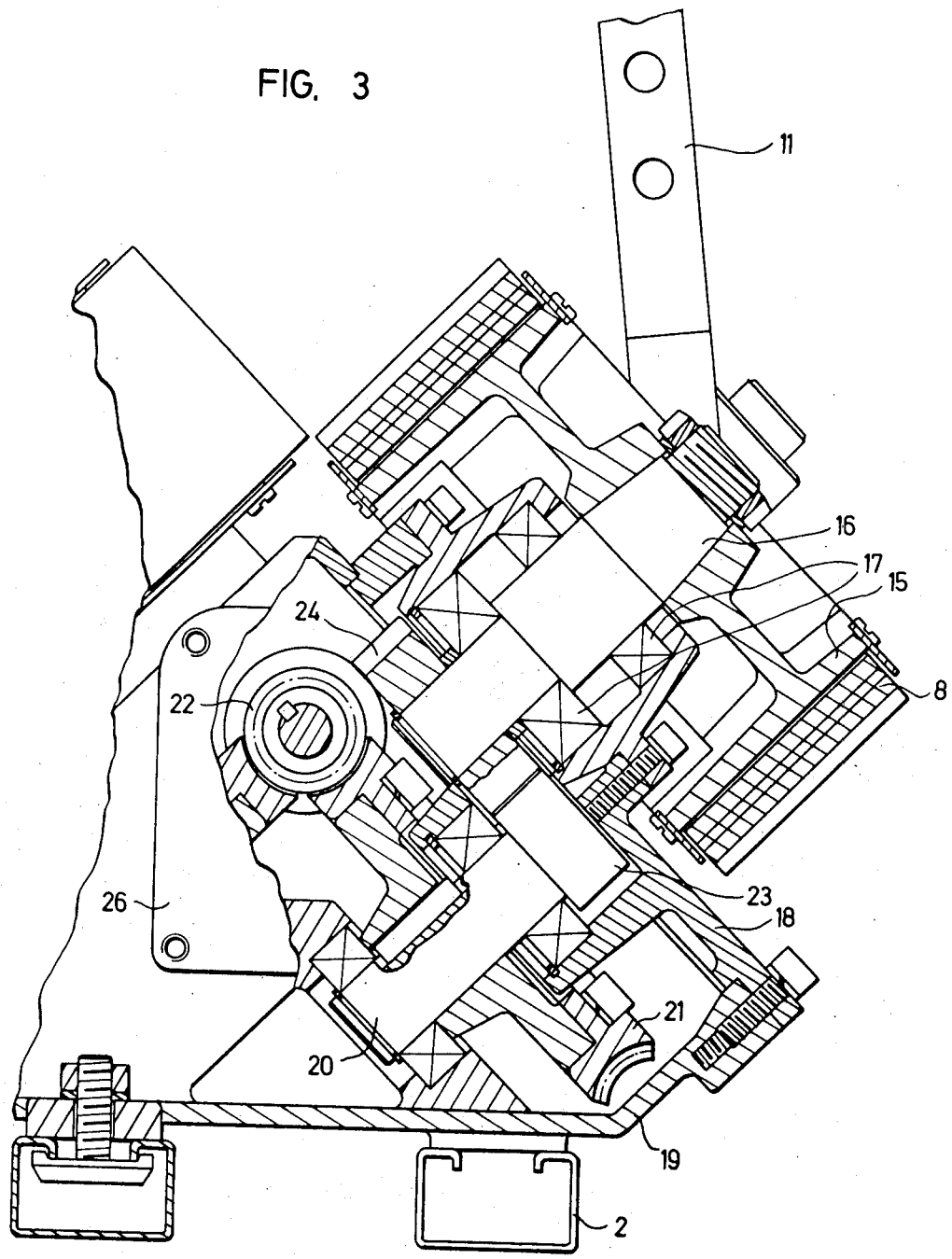
FIG. 3 is a partial view on a larger scale, partly in section taken on the line III—III of FIG. 1 and partly in elevation.

Rollers 15, placed at the ends of each of the supporting and advancing assemblies, may be seen in FIG. 3, one of them being shown in section. It will be seen that the cylindrical side surface of roller 15 has grooves cooperating with the inner ribs of belt 8. Roller 15 is slipped over and secured, if need be by keying, to a shaft 16 on which it is overhangingly supported in a pair of bearings 17 which are in turn secured to a cover 18 placed over an opening in the side of a block 19 forming the body of gear box 4. This block is a molded part, the general profile of which is in the shape of a triangular prism, and which is secured to longitudinal beams 2 of base 1. Mounted within body 19 are also two intermediate shafts 20, likewise disposed in the form of a V at an angle of 90° to one another, parallel to shafts 16, and bearing on the one hand, a pulley 21 cooperating with a single endless screw 22, and on the other hand, a pinion 23 which meshes with a corresponding pinion 24 secured to the lower end of one of the shafts 16. Thus, drive shaft 22, which is supported by motor unit 5 to be described below, comprises a driving screw with which the two pulleys 21, positioned at 90° from one another, engage. Each of the pulleys 21 drives one of the shafts 20, and consequently, one of the shafts 16 and one of the notched belts 8. The advancing gear-train is thus accommodated within an extremely small space between and beneath the supporting and advancing assemblies. As for motor 5 itself, it comprises a block 25 provided with a flange and is secured by bolts to the flange of gear box 4. Hydraulic motor 5 is fed by two pipes 27 connected, as will be seen below, to a control unit situated outside the trench.

Mounted above the supporting and advancing assemblies is the holding assembly 9, comprising four rollers 28 having a V-shaped profile. Two of the rollers 28 are pivoted between two parallel arms 29, while the other two are pivoted in the same way between two arms 30. Arms 29 and 30 are suspended at mid-point on a rocker formed by two arms 31, themselves suspended at mid-point from a stirrup-piece 32. The latter is hooked to a threaded vertical rotary shaft 33 supported and held by a gear box 34 enclosing a spring compensator for taking into account irregularities in the diameter of the cable or pipe to be conveyed. By manually rotating shaft 33 by means of a crank 35, holding assembly 9 can be raised and lowered. Gear box 34 is integral with framework 10, the four uprights 11 which are each composed of two telescoped parts 11a and 11b made integral by removable pins 36.

As may be seen from FIGS. 1 and 4, the lower parts 11b of uprights 11 are provided with stirrup-bolts 37 hinged to the upper parts of fixed shafts 13. Stirrup-bolts 37 are preferably mounted on cylindrical couplings 38 (FIG. 4) held in place by pins 45 at the ends of shafts 13. Thus, by removing the pins 36 situated on one side of the conveyor, it is possible to separate parts 11a from parts 11b of the uprights 11 on that side and to pivot the entire superstructure about the hinge-axes of the stirrup-bolts 37 on the two shafts 13 situated on the other side. The holding assembly then assumes the position shown in dot-dash lines in FIG. 2, so that the cable shown in dot-dash lines as 39 is completely freed.

When the conveyor is in operating position, the cable is lifted and guided by two ramps 40 situated at the front and the rear of the apparatus and is brought up to the level of notched belts 8. Rollers 28 press against the top generatrix of the cable, so that the latter is guided and advanced by notched driving belts. The latter are rectangular in cross-section and can either push the cable in front of them in the trench or pull it into or along the bottom of the trench.

As will be seen from FIG. 2, the apparatus described is capable of moving cables 39 of greatly varying diameters. This figure shows the relative sizes of the maximum and minimum diameter cables which can be advanced by the conveyor described.

Figure 5:
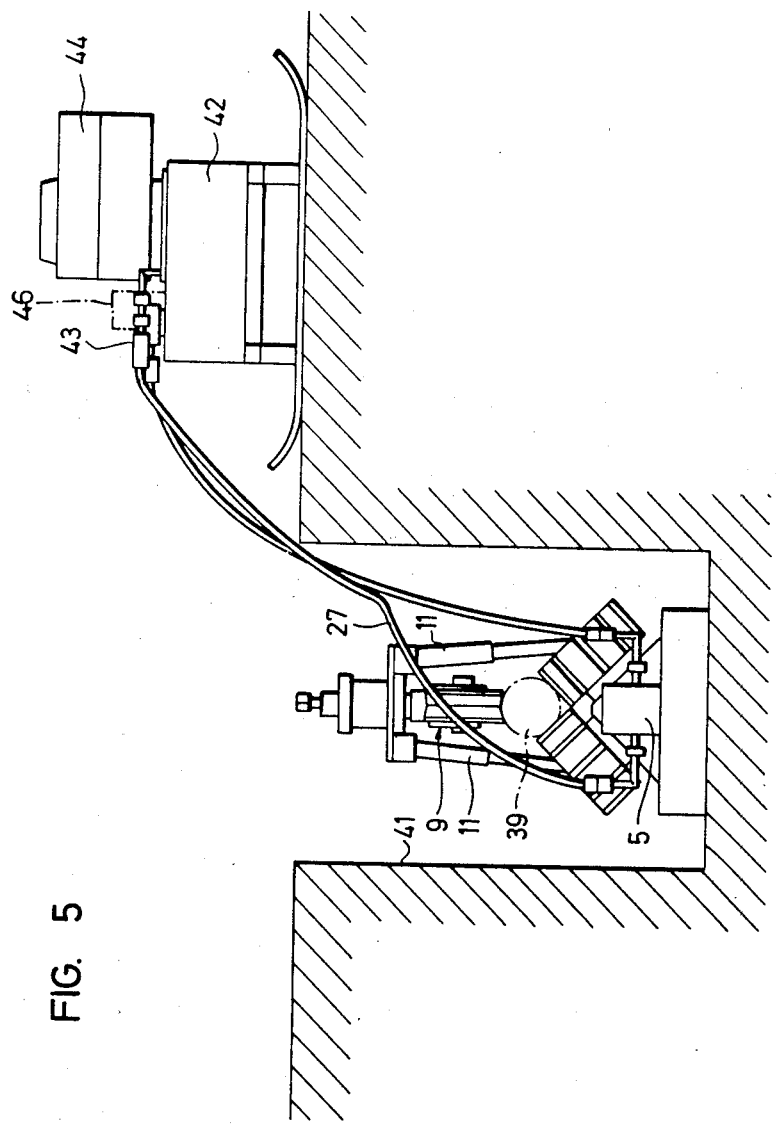
FIG. 5 is a view similar to FIG. 2, on a smaller scale, showing the conveyor installed in a trench and a control unit placed outside the trench.

FIG. 5 shows the conveyor installed at the bottom of a narrow trench 41 as well. The two fluid-feed pipes 27 are connected outside the trench to a control unit 42 which includes a pump driven by a motor 44 which may be an electric motor or an internal combustion engine. Control unit 42 likewise includes gate equipement 43 for regulating the power and speed of the motor 5 and, consequently, the speed of the rollers and ultimately of the cable. These gates may be remote-controlled, and FIG. 5 shows a control box 46 which will be connected by Hertzian transmission means having conductors or by means of another type to a central control station situated near the winch, for instance, and capable of controlling all the conveyors installed at intervals along trench 41.

If an electric motor is provided instead of hydraulic motor 5, the former may be a DC or asynchronous motor; instead of control unit 42 being equipped with pumps and regulating gates, it would then be equipped with a transformer or a converter and with a thyristor-type control device. In this case, the motor may be regulated by voltage variation with a regulating system ensuring a constant speed of advance of the cable, as in the case of the hydraulic control.

It will be realized that the operations can very easily be synchronized by means of a control of this kind; for since all the conveyors are driven at the same speed, there is absolutely no risk of jerking on sections of cable between two conveyors owing to faulty synchronization. Moreover, it suffices to equip the winch with a constant tensile-stress regulator in order for the system to operate automatically and very flexibly. The speed is governed by the conveyors, while the winch causes the first section of cable to advance without pulling it beyond its resistance.

Furthermore, owing to its compact design, and above all owing to the arrangement of the base, between notched belts 8 and beneath them, the dimensions of the structure as a whole are greatly reduced, which considerably facilitates the installation of the conveyor in a narrow trench. As may be seen in FIG. 2, the total width of the apparatus is determined by the distance between the outer edges of belts 8. Neither the motor, nor the drive members, nor the frame exceeds this gauge. The apparatus is light in weight and can be separated into several sections which are easily assembled to one another. Hence, the various parts can be carried separately by one man, so that there is no need for using any hoist to set the apparatus in place. Another advantage of the design described is that the center of gravity of the apparatus is lowered to the maximum, which contributes to its stability despite its light weight.

Finally, owing to the simplicity of design, the cost price of the conveyor is also much lower.

What is claimed is:

1. A cable conveyor comprising a frame, a motor supported by the frame, and a cable-advancing gear-train comprising of two supporting and advancing assemblies disposed in the form of a V and a holding assembly acting vertically on the cable to hold it in contact with the supporting and advancing assemblies, the frame including a rigid base disposed beneath and between the two supporting and advancing assemblies so as not to exceed the width of the cable-advancing gear-train, the motor being accommodated in the frame so as not to exceed the width of the frame, and said supporting and advancing assemblies comprising rollers and shafts bearing the rollers overhangingly, in which conveyor the shafts are connected at one end to the frame, and the holding assembly includes a rigid framework resting upon the free end of certain ones of said shafts.

2. The conveyor of claim 1, wherein the supporting and advancing assemblies comprise at least one driving roller, a driving shaft to which the driving roller is rigidly fixed, and a bearing integral with the frame and supporting the driving shaft at the said end connected to the frame.

3. The conveyor of claim 2, wherein the supporting and advancing assemblies each comprise a series of rollers and an endless belt mounted on the rollers, one of the two end rollers being a driving roller.

4. The conveyor of claim 3, wherein the end rollers are grooved for ensuring the forced driving of the belts.

5. The conveyor of claim 1, further comprising a stirrup bolt, the rigid framework of the holding assembly comprises four uprights, each of which is hinged via said stirrup bolt to the upper end of a shaft, these shafts being fixed and supporting loose rollers.

6. The conveyor of claim 5, wherein the two uprights situated on the same side of the conveyor have hinge points, the uprights of the framework comprise two parts separable from one another for allowing the holding assembly to be moved aside by swinging of the framework about an axis defined by the hinge-points of the two uprights situated on the same side of the conveyor.

7. The conveyor of claim 1, wherein the drive means comprises a motor and a gear-train connecting the shaft of the motor to the driving rollers.

8. The conveyor of claim 7, wherein the motor comprises a hydraulic motor having a speed control, and the conveyor comprises a control unit separate from the frame, connected to the motor by pipes, and arranged for installation beside a trench in which the conveyor is placed.

9. The conveyor of claim 7, wherein the motor comprises an electric motor having a speed control, and the conveyor comprises a control unit separate from the frame, connected to the motor by cables, and arranged for installation beside a trench in which the conveyor is placed.

* * * * *